United States Patent [19]

Vertin

[11] Patent Number: 4,578,875

[45] Date of Patent: Apr. 1, 1986

[54] CHECKING GAGE MODEL AND METHOD OF MAKING THE SAME

[76] Inventor: Thomas D. Vertin, 53355 Washington St., New Baltimore, Mich. 48047

[21] Appl. No.: 542,684

[22] Filed: Oct. 17, 1983

[51] Int. Cl.⁴ .......... G01B 3/00

[52] U.S. Cl. .......... 33/562; 428/71

[58] Field of Search .......... 33/174 G, 562; 428/71, 428/76, 116; 29/421 R, 423; 156/222

[56] References Cited

U.S. PATENT DOCUMENTS

| | | | |
|---|---|---|---|
| 2,460,242 | 1/1949 | Renaud | 33/174 G X |
| 2,755,510 | 7/1956 | Rauter | 33/174 G UX |
| 2,845,379 | 7/1958 | Bey | 33/174 G X |
| 2,895,224 | 7/1959 | Jones | 33/174 G |
| 2,918,727 | 12/1959 | Genetti | 33/174 G |
| 2,976,201 | 3/1961 | Perkins | 154/116 |
| 2,992,939 | 7/1961 | Larson | 117/75 |
| 3,087,848 | 4/1963 | Rash | 156/280 |
| 3,141,053 | 7/1964 | Terry | 264/220 |
| 3,161,555 | 12/1964 | Kish | 156/245 |
| 3,287,197 | 11/1966 | Errede | 156/272 |
| 3,706,622 | 12/1972 | Rush | 156/306 |
| 3,960,639 | 6/1976 | Kudo | 156/222 |
| 4,007,075 | 2/1977 | McClain | 156/62.2 |
| 4,152,183 | 5/1979 | Honacker | 156/78 |
| 4,158,713 | 6/1979 | Degens | 428/212 |
| 4,268,557 | 5/1981 | Bracesco | 428/71 |
| 4,336,090 | 6/1982 | Hilton | 156/154 |
| 4,339,487 | 7/1982 | Mullet | 428/71 |
| 4,346,134 | 8/1982 | Hilton | 428/116 |

FOREIGN PATENT DOCUMENTS

| | | | |
|---|---|---|---|
| 2078628 | 1/1982 | United Kingdom | 428/71 |

*Primary Examiner*—William D. Martin, Jr.
*Attorney, Agent, or Firm*—Robert G. Mentag

[57] ABSTRACT

A checking gage model for quality control use in a production plant, as for example, an automobile plant, for checking mating parts of a car body. The checking gage model includes a frame made from a tubular lightweight material on which is mounted structural filler material that is pre-formed roughly to the desired final configuration. The filler material is shaped, by machine or hand method, to an undersize condition of the desired final shape. At least one layer of industrial type textile woven fibers and resin is then applied on the filler material to encapsulate the same. A surface coat of resin is then added over the textile fibers to a depth to make the contours oversize in the contoured areas of the model. The model is then worked by machine or hand method to form the final shape of the model.

9 Claims, 22 Drawing Figures

32 26 36 14 29 31 36

11
2
10
2
14
13
12

11

11
14
5
4
10
20
4
21
23
16
13
15
17
12
17
5

17
22
21
20
23
16
17
22
21

11
10
17
20
23
17
15
12

31
29
7
26
8
27
17
15
16
14
20
17
20
12
8
10
30
28
7

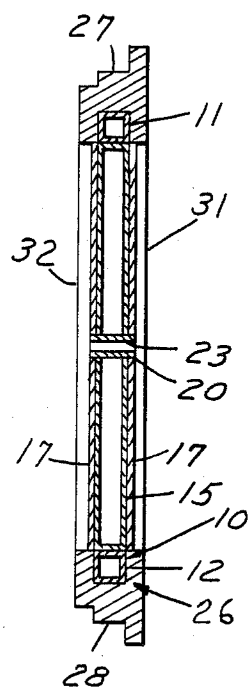
FIG.7
27
11
31
32
23
20
17
17
15
10
12
26
28
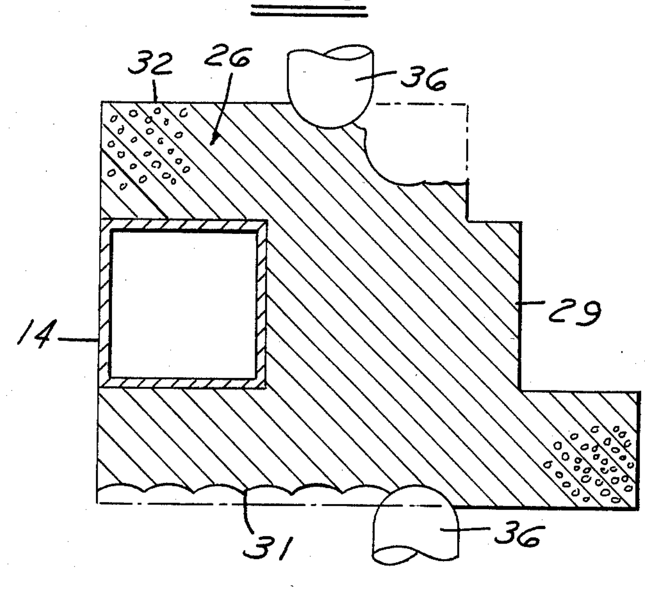
FIG.9
32
26
36
29
14
31
36
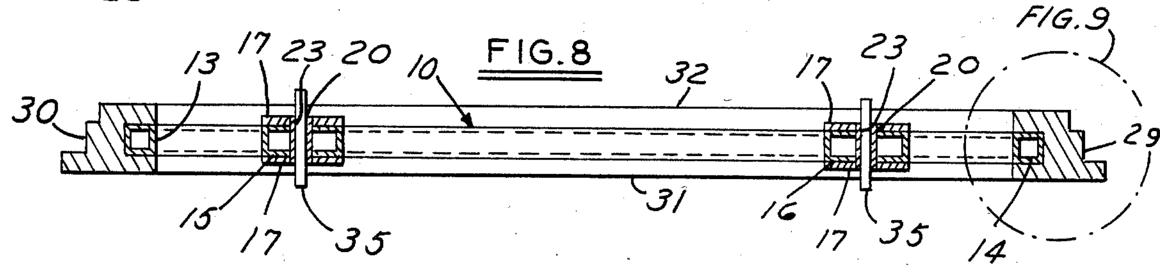
FIG.8
FIG.9
30
13
17
23
20
10
32
17
23
20
29
15
17
35
31
16
17
35
14
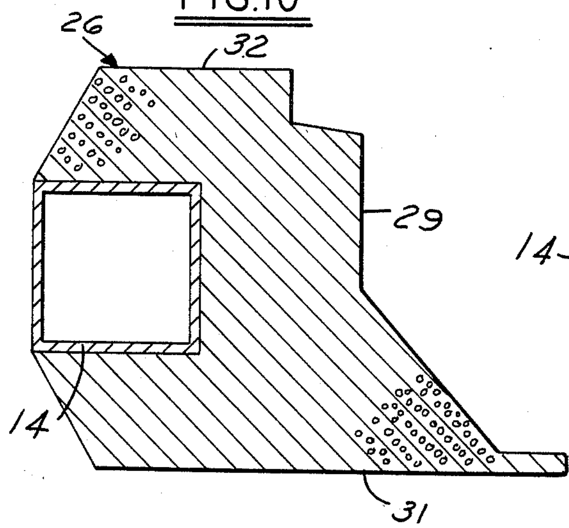
FIG.10
26
32
29
14
31
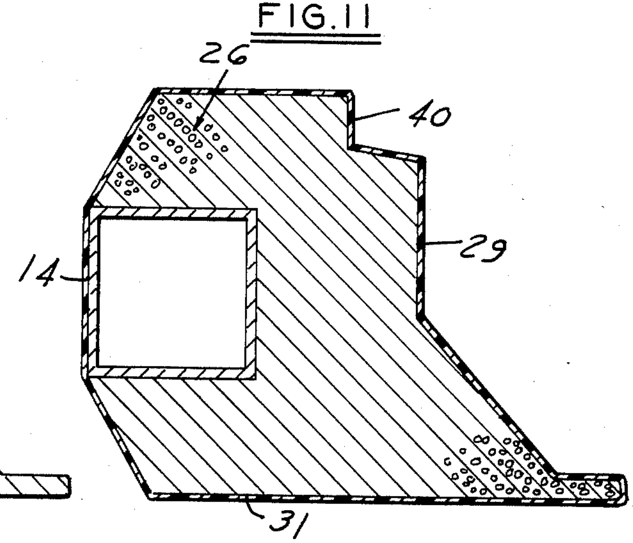
FIG.11
26
40
29
14
31

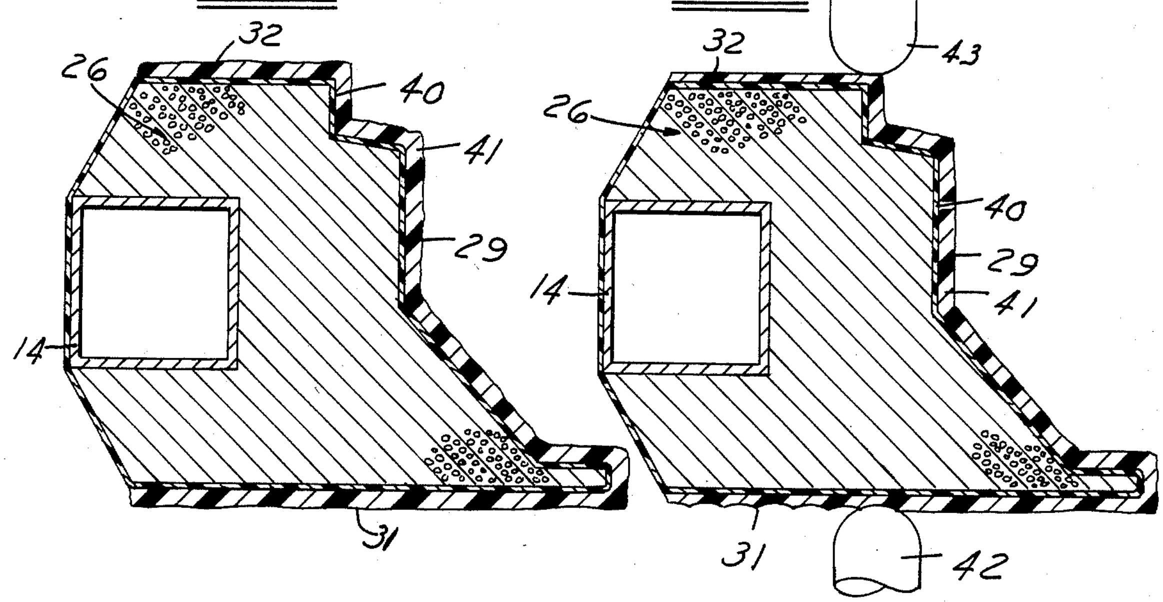
FIG.12
FIG.13
32
26
40
41
29
14
31
43
42
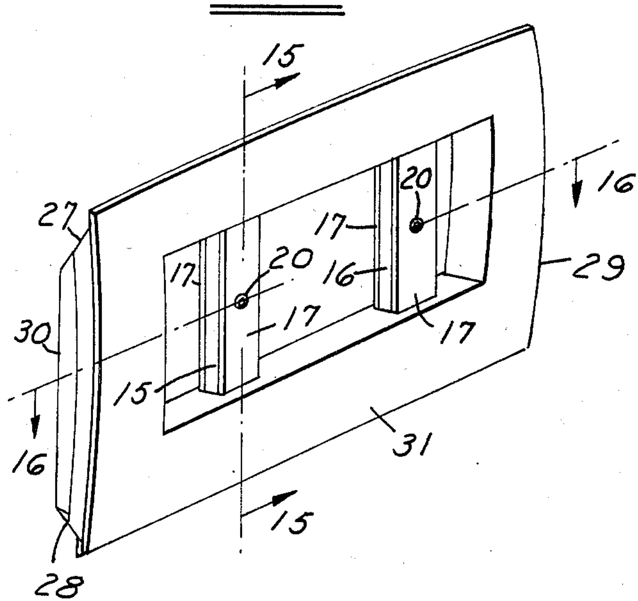
FIG.14
15
16
27
20
17
16
29
30
15
31
28
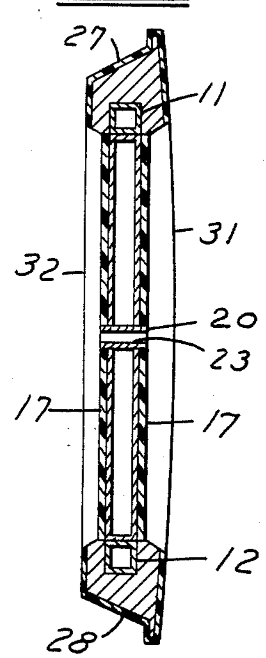
FIG.15
27
11
31
32
20
23
17
12
28
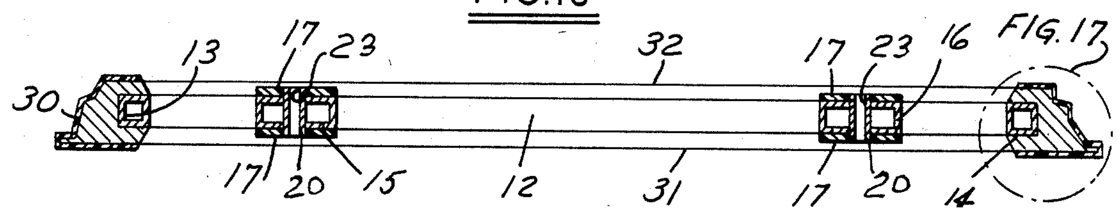
FIG.16
30
13
17
23
32
16
FIG.17
20
15
12
31
14

CHECKING GAGE MODEL AND METHOD OF MAKING THE SAME

TECHNICAL FIELD

This invention relates generally to the art of model making, and particularly to a three-dimensional checking gage model and method of making the same. The checking gage model is adapted for quality control use in a production plant, as for example, an automobile plant, where it may be used at an inspection or check station to serve as a simulated door, and the like, with outer and inner finished surfaces, for checking parts of a car or the like, for dimensional correctness.

BACKGROUND ART

The auto industry and other industries having production assembly lines have developed a concept of checking, which includes the making of a master cube comprising a plurality of the individual panels of an automobile and the like, which may be quickly and easily used at an inspection gage or a check station to insure that the actual panels being assembled are dimensionally correct. Heretofore, in order to make the various checking gage models that comprise the master cube of an autombile, or the like, they were built by first building a wood model of the inner surface and then taking a female mold therefrom, and then laying up inside the female to get an outside shell, and then making a wood model of the inner surface and taking a female mold therefrom, and then getting an outside shell therefrom, and then putting the two shells together. A disadvantage of the aforedescribed prior art method of making a checking gage model is that it is time consuming, and expensive. A checking gage wood model formed in accordance with said prior art method is not stable due to the element of moisture, heat, cold and so forth.

DISCLOSURE OF THE INVENTION

In accordance with the present invention, a dimensionally accurate and stable checking gage model is provided for use in a master cube combination for a production plant employing the same. An advantage of the checking gage model of the present invention is that it is light in weight, very accurate, very stable, and moisture does not effect it. A further advantage of the checking gage model of the present invention is that it includes both the inner and outer surfaces of a model, as well as the peripheral configurations.

The checking gage model of the present invention includes a frame which provides the model with stability. The frame may be made from a suitable structural lightweight tubing, such as steel, plastic, aluminum and the like. A very stable and light structural filler material, such as a foam plastic material, is mounted on the frame, and shaped to any desired configuration which includes the outer and inner surfaces of the model. The filler material is shaped, by machine or hand method, to an undersized condition of the desired final shape. A layer of industrial type textile woven fibers and resin is then applied on the foam material to encapsulate the foam plastic material. A surface coat of resin is then added to the model that leaves the contour full of the finish in all the contour areas of the model. The model is then worked by machine or hand methods to form the final shape of the same to the desired dimensional tolerance. The model includes coordinated inner and outer surfaces as well as lightness, strength, accuracy and durability. The checking gage model may be provided with insert plates for tapping, drilling, precision holes and the like, as well as with insert stiffener ribs for thin section simulation. The complete inner and outer surfaces of the checking gage model may be completed.

BRIEF DESCRIPTION OF THE DRAWINGS

FIG. 7 is an enlarged, elevation section view of the partially formed checking gage model structure illustrated in FIG. 6, taken along the line 7—7 thereof, and looking in the direction of the arrows.

FIG. 8 is an enlarged, horizontal section view of the partially formed checking gage model structure illustrated in FIG. 6, taken along the line 8—8 thereof, and looking in the direction of the arrows.

FIG. 9 is an enlarged view of the cross section structure shown within the circle marked "9" in FIG. 8, and showing the method step of dimensionally machining the filler material on the partially formed checking gage model to a rough, undersize condition.

FIG. 10 is a similar view of the same checking gage model structure illustrated in FIG. 9, but showing the filler material worked to an undersize finish surface condition.

FIG. 11 is a view similar to FIG. 10 and showing the undersize finish surface condition of the checking gage model encapsulated with a layer of fiber cloth impregnated with resin, and which cloth encompasses the tubular frame and the foam filler material.

FIG. 12 shows the checking gage model structure of FIG. 11 provided with a surface coat of resin, which is added over the resin impregnated fiber cloth to give the model a plus or oversize condition in all contour areas.

FIG. 13 illustrates a machining of the oversize surface coat of resin of FIG. 12 down to the correct or print dimensional tolerance.

FIG. 14 is an elevation perspective view of a finished checking gage model made in accordance with the principles of the present invention.

FIG. 15 is an elevation section view of the finished checking gage model illustrated in FIG. 14, taken along the line 15—15 thereof, and looking in the direction of the arrows.

FIG. 16 is a horizontal section view of the checking gage model structure illustrated in FIG. 14, taken along the line 16—16 thereof, and looking in the direction of the arrows.

BEST MODE OF CARRYING OUT THE INVENTION

Figure 1:
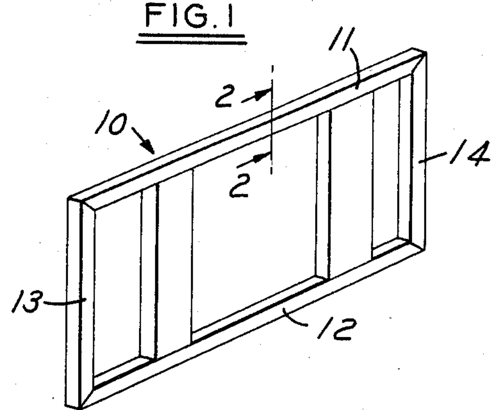
FIG. 1 is an elevation perspective view of a tubular frame employed in carrying out the principles of the present invention.

Referring now to the drawings, and in particular to FIG. 1, the numeral 10 generally designates a rectangular, tubular frame employed in carrying out the principles of the present invention. The frame 10 is substantially rectangular in vertical configuration since it is used to illustrate the principles of the invention in the making of a checking gage model which simulates an automobile door panel. It will be understood that variously shaped frames would be employed, in providing checking gage models made in accordance with the principles of the present invention, for the variously shaped panels of an automobile which are not rectangular in vertical or horizontal configuration.

Figure 2:
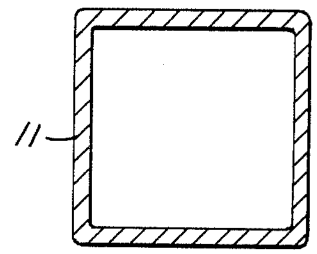
FIG. 2 is an enlarged, elevation section view of a portion of the frame illustrated in FIG. 1, taken along the line 2—2 thereof, and looking in the direction of the arrows.
Figure 3:
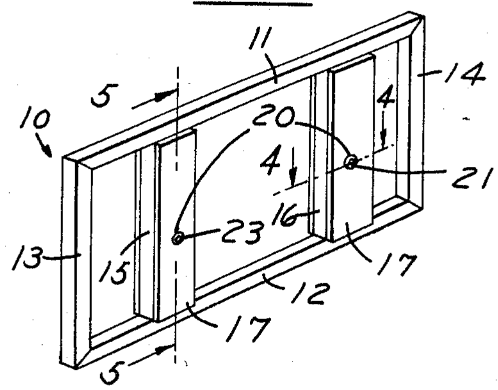
FIG. 3 is an elevation perspective view of the tubular frame employed in the invention and showing the frame provided with tubular locating base members and locating holes.
Figure 4:
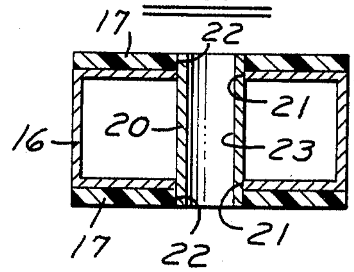
FIG. 4 is an enlarged, horizontal section view of a tubular locating base member employed in the tubular frame illustrated in FIG. 3, taken along the line 4—4 thereof, and looking in the direction of the arrows.

The frame 10 is illustrated as comprising a horizontal upper elongated tubular member 11 and a lower horizontal elongated tubular member 12, with the ends of said upper and lower horizontal tubular members 11 and 12, respectively, being interconnected by a pair of vertical tubular end members 13 and 14. Tubular members 11 through 14 may be made of any suitable material, as for example steel, aluminum, high tensile plastics and the like. FIG. 2 illustrates the square tubular cross section of the upper frame member 11. The frame 10 forms the backbone of the finished check gage model, and it provides an even amount of stability in the middle of the model. The frame 10 is stress relieved. The tubular parts 11 through 14 of the frame 10 are fixedly secured to each other by any suitable means, as by welding when steel tubular members are used.

Figure 5:
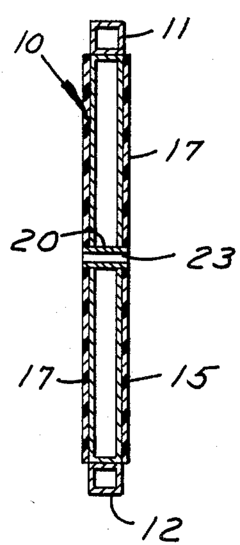
FIG. 5 is an enlarged, vertical section view of one of the tubular locating base members employed in the tubular frame structure of the FIG. 3, taken along the line 5—5 thereof, and looking in the direction of the arrows.
Figure 6:
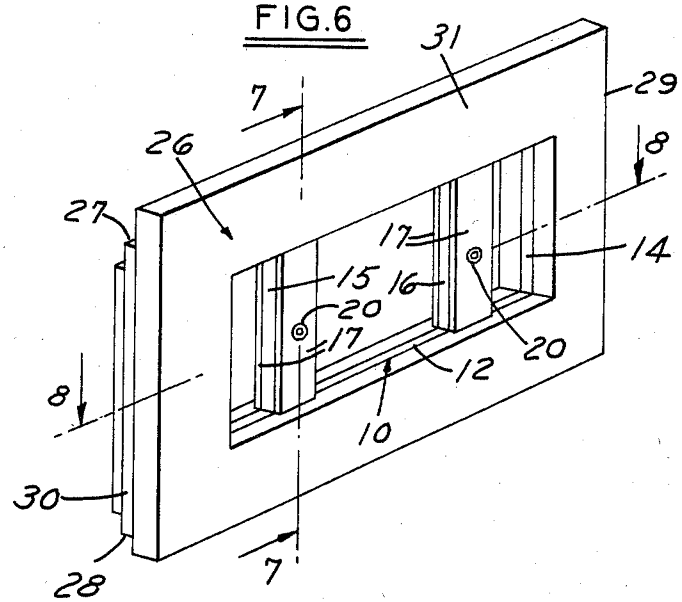
FIG. 6 is an elevation perspective view showing the tubular frame structure of FIG. 5 provided with filler material to provide a partially formed checking gage model.
Figure 17:
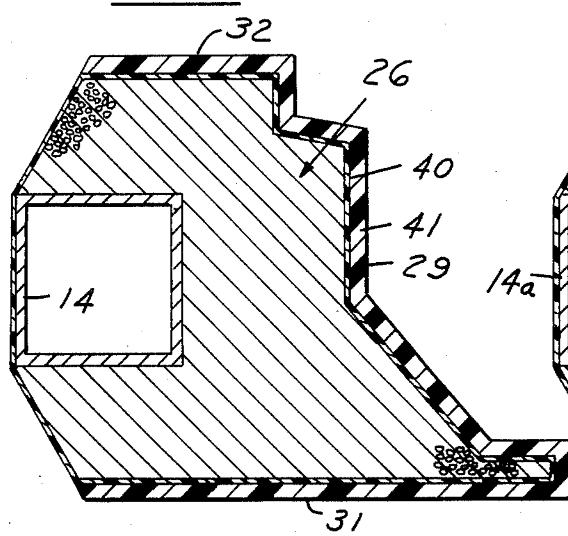
FIG. 17 is an enlarged view of the checking gage model cross section structure shown within the circle marked "17" in FIG. 16, and showing the finished contour of the front end of the checking gage model.

As shown in FIG. 5 the model frame 10 is provided with a pair of vertical support members 15 and 16 which are disposed between the upper and lower tubular frame members 11 and 12, and fixedly secured thereto, by any suitable means, as by welding when the tubular frame parts are made of metal. As shown in FIGS. 5 and 6 the tubular support members 15 and 16 are each provided with an outer pad of machinable material base members 17, as for example, a suitable resin material. The outer faces of all the base pads 17 are machined flat and parallel to each other to establish a base for each side of the model for location purposes of both sides of the model for machining and inspection operations. The resin base members 17 are fixedly secured to the outer faces of each of the support members 15 and 16 by any suitable means, as by being bonded thereto by a suitable adhesive, as a urethane or epoxy adhesive. Each of the support members 15 an 16 is provided with a transverse cylindrical tube 20 which is mounted through suitable holes 21 formed through the transverse walls of each of the support members 15 and 16, and through suitable holes 22 formed through the base pad members 17. The holes or bore 23, through each of the cylindrical tubes 20, provides a locating hole for the reception of a suitable locating pin for machining the contour surfaces of the model, as more fully explained hereinafter. The machining of the outer faces of the base pads 17 on both sides of the model and the tooling holes 23 permits the machine setup of the model in all three axes, that is on the "X", "Y" and "Z" axes on a machine table relative to a machine head, for machining the peripheral contours of the model. The machining of the outer faces of all of the pads 17 provides main machining bases, at a body dimension. The tooling holes 23 set up the other two planes in relation to the body dimension.

As shown in FIGS. 6, 7 and 8, a filler material 26 is formed from a block of suitable material, and it is provided with a rough overall shape similar to the final dimensional shape of the desired checking gage model. The filler material 26 may be any suitable material, as for example, wood, styrofoam, plastic and the like. The filler material 26 is bonded or mechanically fastened to the frame 10. The filler material 26 is very light in weight, and is stable, and it can be constructed to any configuration of the desired final model shape. FIGS. 6, 7 and 8 show the lightweight filler material 26 to be provided with a rough shaped upper edge 27, a lower edge 28, a front vertical edge 29, and a rear vertical edge 30. The filler material 26 is also provided with a rough dimensional size surface or face 31 on the front periphery thereof and a rear rough shaped vertical surface or face 32 on the rear periphery of the filler material 26.

The partially completed checking gage model shown in FIGS. 6, 7 and 8 is next mounted on a suitable machine, and by means of the base pads 17 and locating pins, as indicated by the numeral 35 in FIG. 8, the partially completed model can be accurately mounted on a machine table relative to a machine head carrying a suitable cutting tool, as a round nosed tool 36 (FIG. 9). The outer and inner faces 31 and 32, and the contoured peripheries 27 through 30 can thus be roughly cut to an undersize dimension relative to the desired finish dimension. It will be understood that first one surface, as for example the outer surface 31 would be rough cut and then the partially completed model would be flipped over and the inner surface 32 would be rough cut to another size dimension. The rough cut is made to an undersize depth of about $\frac{1}{4}$ inch.

FIG. 10 illustrates the next step in the process of making the final checking gage model. The rough under cut outer and inner surfaces 31 and 32, and the peripheral surfaces 27 through 30, are hand finished down to a finished, undersize condition. FIGS. 9 and 10 illustrate the rough under cutting and finish under cutting of the front vertical periphery and inner and outer surfaces 31 and 32 of the model, and it will be understood that all the other contour surfaces are similarly processed.

The modeling or working down of the styrofoam oversize model illustrated in FIGS. 6, 7 and 8 can be carried out by either machining operations or hand methods, for both of the rough undersize modeling operation illustrated in FIG. 9 and the finished undersize modeling operation illustrated in FIG. 10. A suitable machine for carrying out the last mentioned undersize rough and finish machining operations is the automatic machining apparatus disclosed in U.S. Pat. No. 3,640,182. The machining data for operating the machine disclosed in said patent would be conventional numerical control data supplied by the designer of the automobile or the like, for which the checking gage model would be made. The rough cutting operation for making the undersize shape of the model as shown in FIG. 9 may also be carried out by other means as for example duplication methods, a line tracking method, and so forth.

After all of the peripheral surfaces 27 through 30 and the front and rear surfaces 31 and 32 have been brought to a finish undersize dimension, the partially completed checking gage model then has all of the surfaces wrapped or encapsulated with an industrial textile woven fiber 40 impregnated with resin. This modeling step provides an undersize fiber 40 shell model. The textile woven fiber may be of any suitable type, as for example a fiberglass cloth, a kevelar cloth, graphite and so forth. Preferably, two layers of the fiberglass cloth are applied, and they are secured in place by a suitable adhesive, as by a suitable epoxy or a urethane material. The fiberglass cloth and resin are manually applied to the model.

The next step in the method of making the checking gage model of the present invention is to apply a surface coat of a suitable resin 41 (FIG. 12) over the contoured peripheral edges 27 through 30, and the front and rear surfaces 31 and 32, respectively. This coat of resin 41 is manually applied to a thickness to leave the last mentioned contoured edges, and inner and outer surfaces oversize. For example, the surface coat of resin 41 would be added until it brings the overall size of the model to approximately an $\frac{1}{8}$ of an inch oversize. A suitable resin for the surface coat 41 may be any suitable urethane, aluminum filled epoxy, aluminum filled urethane, and the like.

FIG. 13 shows the finish working or modeling of the outer surface of the resin 41 down to the finished desired dimension of the checking gage model. The finishing may be done by the machine illustrated in the aforementioned U.S. Pat. No. 3,640,182 under a numerical control system, so as to make a rough cut to the finish size with a cutter 42, and then a finish cut with a cutter 43. It will be understood that detailed cutters may be used for cutting sharp corners. It will also be understood that the final finish surface, and all the contoured edges 27 through 30, and the inner and outer surfaces 31 and 32, respectively, may also be hand finished to the desired dimensional size.

The last described machining or hand methods of working the final surfaces of the model brings such surfaces and contour areas to dimensional or print tolerance.

FIGS. 14 through 17 show a finished checking gage model made in accordance with the principles of the present invention and in which the inner and outer surfaces 31 and 32 are shaped differently and the contoured peripheral edges 27–30 are all shaped differently. FIGS. 9, 10, 11, 12 and 13 were employed to illustrate the method steps for the forming of the peripheral contoured front edge 29, and it will be understood that the other differently shaped peripheral edges 27, 28 and 30 would be formed by the same method steps. It will be seen that the inner and outer surfaces 31 and 32 are not complete surfaces, since it is not necessary for these surfaces to be complete to provide a checking gage model for checking the peripheral fitting relationship with the mating panels of a complete master cube.

Figure 18:
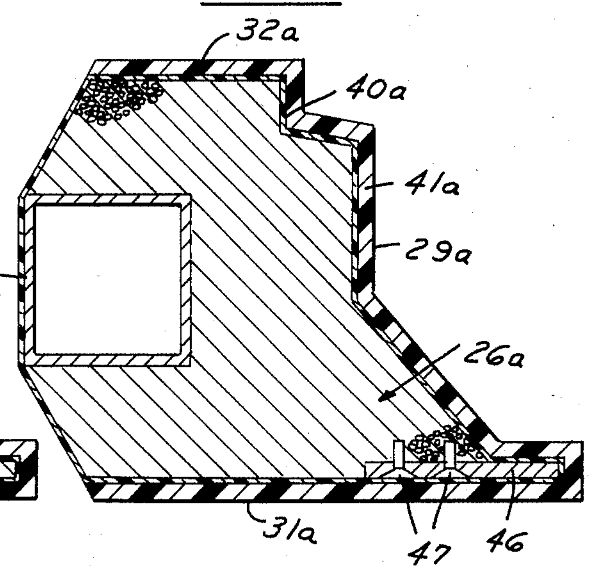
FIG. 18 is a cross section view, identical to FIG. 17, and showing a modification of the checking gage model provided with a metal stiffener rib.

FIG. 18 illustrates a modification of the invention in which a stiffener rib 46 is applied along the length of a thin section of a model. The stiffener rib 46 would be inserted in the outer face of the styrofoam 26 and be fixedly secured in position by suitable machine screws 47. The parts of the embodiment of FIG. 18 which are the same as the first described embodiment of FIGS. 1 through 17 have been marked with the same reference numerals followed by the small letter "a".

Figure 19:
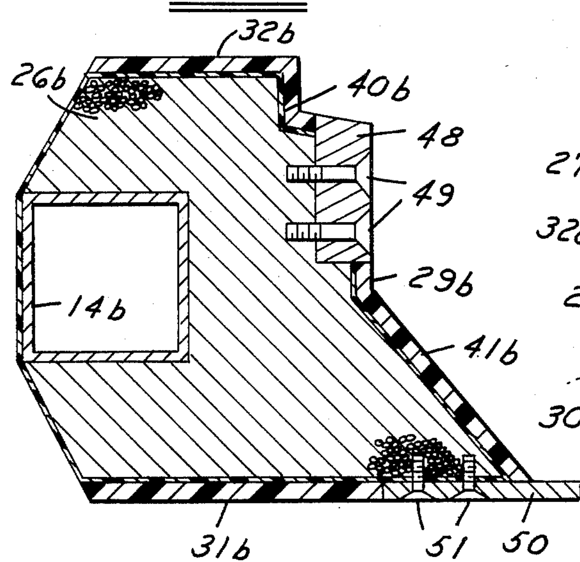
FIG. 19 is a cross section view, identical to FIG. 17, and showing a modification of the checking gage model provided with tapping plates.

FIG. 19 shows further modification of the invention wherein insert plates may be employed. The parts of the embodiment of FIG. 19 which are the same as the first described embodiment of FIGS. 1 through 17 have been marked with the same reference numerals followed by the small letter "b". FIG. 18 illustrates an insert plate 48 for tapping, drilling, precision holes and so forth. The plate 48 would be held in place in the recess formed in the periphery **29*b* by suitable screws 49. A second insert plate 50 is shown mounted in the right edge of the outer surface 31*b*, and it is secured in place by suitable screws 51. It will be understood that similar insert plates of any desired length and width may be also inserted in the other peripheral contoured areas 27, 28 and 30, and in the inner and outer surfaces 31*b* and 32*b***, respectively, as desired.

Figure 20:
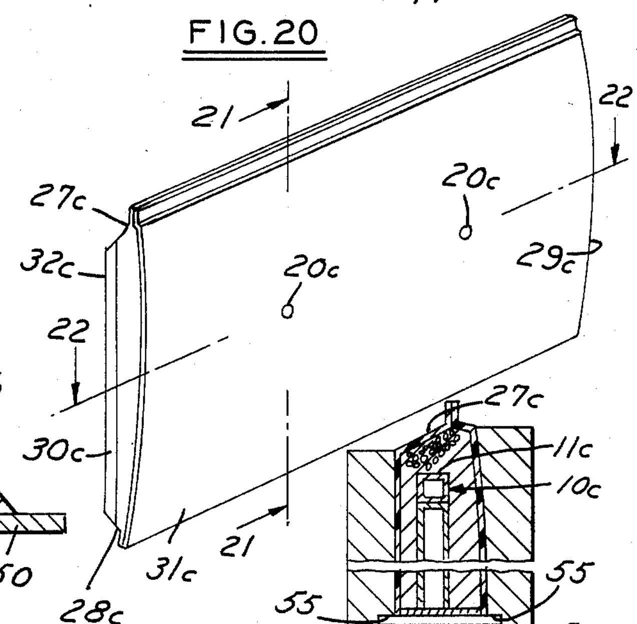
FIG. 20 is an elevation perspective view of a finished checking gage model made in accordance with the principles of the present invention, and provided with a finished inner surface, a finished outer surface, and finished contoured peripheral surfaces.
Figure 21:
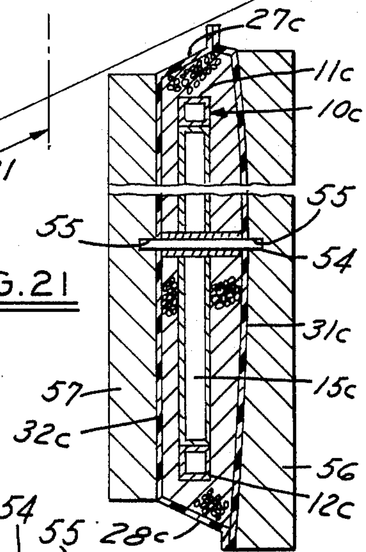
FIG. 21 is an elevation section view of the finished checking gage model illustrated in FIG. 20, taken along the line 21—21 thereof, and looking in the direction of the arrows.
Figure 22:
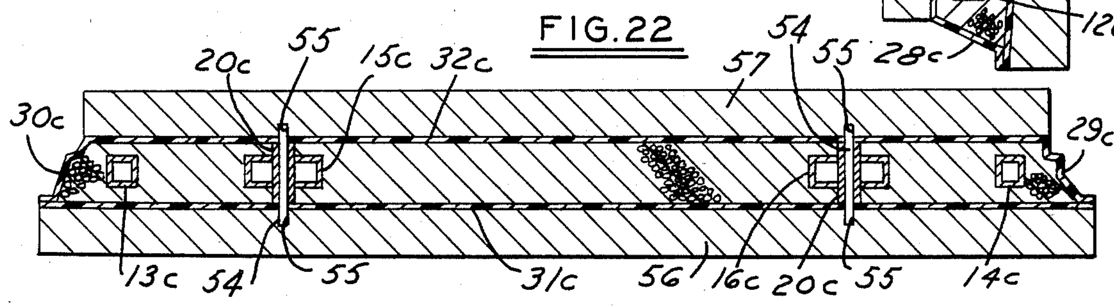
FIG. 22 is a horozontal section view of the finished checking gage model illustrated in FIG. 20, taken along the line 22—22 thereof, and looking in the direction of the arrows.

FIGS. 20, 21 and 22 illustrate another embodiment of the invention. The parts of the embodiment of FIGS. 20 through 22 which are the same as the first described embodiment of FIGS. 1 through 17 have been marked with the same reference numerals followed by the small letter "c". In the embodiment of FIGS. 20 through 22, the inner and outer surfaces **31*c* and 32*c* are completely formed. These surfaces are machined to the finish dimension and then they provide locating means for carrying out the machining operations on the contoured peripheral portions 27*c* through 30*c*. The base pads 17 of the first embodiment are not employed in the embodiment of FIGS. 20 through 22. However locating pins 54 are carried in the locating cylindrical members 20*c*, and they extend into suitable holes 55 in a pair of skid bases 56 and 57, which are mounted along the outer and inner surfaces 31*c* and 32*c*, respectively. The skid bases 56 and 57 are accurately formed, rectangular locating members which may be made of many suitable stable material, as metal, and they co-act with the locating pins 54** to provide the "X", "Y", and "Z" axes for machining the contoured peripheral areas and the inner and outer surface areas of the model.

The checking gage model of the present invention is used in quality control in production plants as, for example, in automobile production plants. The basic body and many parts are made and assembled by the production plant, and other components come in from subassembly plants and must match the portion of the automobile body that the production plant has made and fabricated. Accordingly, some type of inspection or check station as it is called in the trade, is employed. In carrying out the quality control procedures, said production plants have employed a master cube which simulates in shape and dimensions a finished car in accordance with the design specifications and tolerances. The master cube comprises a plurality of checking gage models which have the inner and outer panels formed thereon. The master cube includes models for the various portions of an automobile body. Heretofore, the various checking gage models were made in accordance with conventional procedures of making female models and male models therefrom, for both the inner and outer surfaces of an automobile panel as, for example, a door panel. Such prior art procedures are costly and time consuming to make. The three-dimensional checking gage model of the present invention can be quickly and easily made in accordance with the method of the present invention to provide an accurate checking gage model in accordance with the design or print dimensions. The checking gage model of the present invention provides a complete coordination of an inner model to an outer model, and it has the advantages of lightness, strength, accuracy, durability, and the ability to simulate flanges in body positions.

The checking gage model of the present invention, and the method of making the same, may be employed to make all the different master panels or models necessary to provide a master environmental cube or prototype of a final product, as for example, an automobile, airplane and the like. A master environmental cube, including all the necessary different panel models, can be used as a checking-type fixture for evaluating pre-prototype, protype or panels made from production sheet metal panels, or plastic panels, or any type of material in the pre-prototype stage, the prototype stage, and all the way through to the production stage. The checking or gage models in the master cube or fixture can be replaced with sheet metal production or prototype panels, so that these panels have a direct comparison of surface, openings and seal surfaces, which are represented in the master cube. A single master gage model can be removed from the cube and a prototype or production piece put in its place, and evaluated in the master cube.

The three-dimensional data can be supplied by a duplicating machine. Balls, bases and pads could be employed in place of the locating pins 54.

INDUSTRIAL APPLICABILITY

The three-dimensional checking gage model of the present invention is adapted for use in production shops for quality control purposes as, for example, in an automobile plant, when it is necessary to check the relationship of the various panels comprising an automobile body when they are assembled in a production plant. The whole workings of a panel as, for example, a door panel are not needed, and the important portions of the checking gage model are the inner and outer surfaces and the peripheral contoured areas.

I claim:

1. In a method for making a three-dimensional checking gage model, for an automobile door panel and the like, having inner and outer three-dimensional variant contoured surfaces, and a three-dimensional variant contoured periphery about said surfaces and connecting said surfaces, the steps comprising:

(a) providing a lightweight frame;

(b) providing said frame with locating means including locating base means;

(c) affixing on the frame a piece of modelable filler material which is pre-formed approximately to the three-dimensional rough shape of a finished checking gage model;

(d) modeling the filler material to provide three-dimensional variant undersize finished contoured inner and outer surfaces and a three-dimensional variant contoured periphery;

(e) applying at least one layer of a textile fiber material cloth to the undersize finished three-dimensional variant contoured surfaces and periphery;

(f) adding a surface coat type material, over the textile fiber material, to the three-dimensional variant contoured undersize surfaces and periphery to make said surfaces and periphery oversize; and, (g) modeling the surface coat type material down to the finished three-dimensional size for three-dimensional variant contoured inner and outer surfaces and three-dimensional variant contoured periphery.

2. A method for making a three-dimensional checking gage model, and for an automobile door panel and the like, as defined in claim 1, wherein:

(a) the modeling of the filler material to provide variant undersize finished contoured inner and outer surfaces and a contoured periphery is carried out by machining the same from three-dimensional data.

3. A method for making aa three-dimensional checking gage model, for an automobile door panel and like, as defined in claim 1, wherein:

(a) the modeling of the filler material to provide variant undersize finished contoured inner and outer surfaces and a contoured periphery is carried out by manually modeling the same from three-dimensional data.

4. A method for making a three-dimensional checking gage model, for an automobile door panel and the like, as defined in claim 1, wherein:

(a) the modeling of the filler material to provide variant undersize finished contoured inner and outer surfaces and a contoured periphery is carried out by a sequence of machining and manual modeling operations from three-dimensional data.

5. A method for making a three-dimensional checking gage model, for an automobile door panel and the like, as defined in claim 1, wherein:

(a) the modeling of the surface coat type material to provide variant undersize finished contoured inner and outer surfaces and a contoured periphery is carried out by machining the same from three-dimensional data.

6. A method for making a three-dimensional checking gage model, for an automobile door panel and the like, as defined in claim 1, wherein:

(a) the modeling of the surface coat type material to provide variant undersize finished contoured inner and outer surfaces and a contoured periphery is carried out by manually modeling the same from three-dimensional data.

7. A method for making a three-dimensional checking gage model, for an automobile door panel and the like, as defined in claim 1, wherein:

(a) the modeling of the surface coat type material to provide undersize finished contoured inner and outer surfaces and a contoured periphery is carried out by a sequence of machining and manual modeling operations from three-dimensional data.

8. A method for making a three-dimensional checking gage model, for an automobile door panel and the like, as defined in claim 1 including:

(a) providing the model with insert plates for the forming of holes for the receptions of hinge securing means and the like.

9. A method for making a three-dimensional checking gage model, for an automobile door panel and the like, as defined in claim 1, including:

(a) providing the model with inserted stiffener plates.

* * * * *